(12) United States Patent
Aghdaie et al.

(10) Patent No.: US 11,458,399 B2
(45) Date of Patent: *Oct. 4, 2022

(54) SYSTEMS AND METHODS FOR AUTOMATICALLY MEASURING A VIDEO GAME DIFFICULTY

(71) Applicant: Electronic Arts Inc., Redwood City, CA (US)

(72) Inventors: Navid Aghdaie, San Jose, CA (US); John Kolen, Half Moon Bay, CA (US); Mohamed Marwan Mattar, San Francisco, CA (US); Mohsen Sardari, Redwood City, CA (US); Su Xue, Fremont, CA (US); Kazi Atif-Uz Zaman, Foster City, CA (US); Meng Wu, Fremont, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,315

(22) Filed: Oct. 12, 2020

(65) Prior Publication Data

US 2021/0093974 A1 Apr. 1, 2021

Related U.S. Application Data

(63) Continuation of application No. 16/455,448, filed on Jun. 27, 2019, now Pat. No. 10,799,798, which is a
(Continued)

(51) Int. Cl.
*A63F 13/67* (2014.01)
*A63F 13/537* (2014.01)
*A63F 13/822* (2014.01)

(52) U.S. Cl.
CPC ............ *A63F 13/67* (2014.09); *A63F 13/537* (2014.09); *A63F 13/822* (2014.09)

(58) Field of Classification Search
CPC ....... A63F 13/67; A63F 13/537; A63F 13/822
See application file for complete search history.

(56) References Cited

U.S. PATENT DOCUMENTS 5,274,801 A 12/1993 Gordon
5,683,082 A 11/1997 Takemoto et al.
(Continued)

FOREIGN PATENT DOCUMENTS

CN 104657412 A 5/2015
KR 10-2009-0092007 A 8/2009
(Continued)

OTHER PUBLICATIONS

Aponte et al., "Measuring the level of difficulty in single player video games," Elsevier, Entertainment Computing (2011) 205-213.
(Continued)

*Primary Examiner* — Werner G Garner
(74) *Attorney, Agent, or Firm* — Knobbe, Martens, Olson & Bear, LLP

(57) ABSTRACT

Embodiments of the systems and methods described herein can automatically measure the difficulty metrics associated with various aspects of a video game using an artificial intelligence system. The artificial intelligence system may include multiple game agents. Telemetry data associated with the gameplay of each game agent may be recorded while the game application is automatically executed by the game agents. The telemetry data may be communicated to a data analysis system which can calculate game difficulty metrics for various aspects of the game. The data analysis system can determine game difficulty associated with the various aspects based on the game difficulty metrics. The
(Continued)

results from the data analysis system may be visualized and communicated to a game developer for updating the operations of the video game.

17 Claims, 9 Drawing Sheets

Related U.S. Application Data continuation of application No. 15/395,949, filed on Dec. 30, 2016, now Pat. No. 10,384,133.

(56) References Cited

U.S. PATENT DOCUMENTS

| | | |
|---|---|---|
| 6,106,395 A | 8/2000 | Begis |
| 6,253,193 B1 | 6/2001 | Ginter et al. |
| 6,285,380 B1 | 9/2001 | Perlin |
| 7,390,254 B2 | 6/2008 | Hirai |
| 7,636,701 B2 | 12/2009 | Funge et al. |
| 8,100,770 B2 | 1/2012 | Yamazaki et al. |
| 8,142,282 B2 | 3/2012 | Canessa et al. |
| 8,267,764 B1 | 9/2012 | Aoki et al. |
| 8,398,476 B1 | 3/2013 | Sidhu et al. |
| 8,540,560 B2 | 9/2013 | Crowley et al. |
| 8,821,290 B2 | 9/2014 | Fujisawa et al. |
| 8,907,193 B2 | 12/2014 | Cross et al. |
| 8,914,251 B2 | 12/2014 | Ohta |
| 9,001,118 B2 | 4/2015 | Molyneaux et al. |
| 9,013,489 B2 | 4/2015 | Evertt et al. |
| 9,033,796 B2 | 5/2015 | Fujisawa et al. |
| 9,069,441 B2 | 6/2015 | Jacob |
| 9,616,329 B2 | 4/2017 | Szufnara et al. |
| 9,919,217 B2 | 3/2018 | Aghdaie et al. |
| 10,004,984 B2 | 6/2018 | Voris et al. |
| 10,105,603 B2 | 10/2018 | Bucher |
| 10,286,323 B2 | 5/2019 | Aghdaie et al. |
| 10,357,718 B2 | 7/2019 | Aghdaie et al. |
| 10,478,730 B1 | 11/2019 | Burnett |
| 10,569,176 B2 | 2/2020 | D'angelo et al. |
| 10,713,543 B1 | 7/2020 | Skuin et al. |
| 10,799,798 B2 | 10/2020 | Aghdaie et al. |
| 10,807,004 B2 | 10/2020 | Aghdaie et al. |
| 10,839,215 B2 | 11/2020 | Somers et al. |
| 10,940,393 B2 | 3/2021 | Somers et al. |
| 10,953,334 B2 | 3/2021 | Kolen et al. |
| 2004/0067788 A1 | 4/2004 | Angelopoulos |
| 2004/0152512 A1 | 8/2004 | Collodi et al. |
| 2005/0130725 A1 | 6/2005 | Creamer et al. |
| 2007/0054717 A1 | 3/2007 | Youm et al. |
| 2007/0060364 A1 | 3/2007 | Osgood et al. |
| 2007/0066403 A1 | 3/2007 | Conkwright |
| 2007/0260567 A1 | 11/2007 | Funge et al. |
| 2008/0097948 A1 | 4/2008 | Funge et al. |
| 2008/0266250 A1 | 10/2008 | Jacob |
| 2008/0268961 A1 | 10/2008 | Brook |
| 2009/0202114 A1 | 8/2009 | Morin et al. |
| 2009/0307671 A1 | 12/2009 | White et al. |
| 2010/0144444 A1 | 6/2010 | Graham |
| 2010/0302257 A1 | 12/2010 | Perez et al. |
| 2011/0007079 A1 | 1/2011 | Perez et al. |
| 2011/0035280 A1 | 2/2011 | Fordyce, III |
| 2011/0295649 A1 | 12/2011 | Fine et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0233105 A1 | 9/2012 | Cavallaro et al. |
| 2012/0244941 A1 | 9/2012 | Ostergren et al. |
| 2012/0276964 A1 | 11/2012 | Jones et al. |
| 2012/0309520 A1 | 12/2012 | Evertt et al. |
| 2013/0178281 A1 | 7/2013 | Ayyar et al. |
| 2013/0316779 A1 | 11/2013 | Vogel |
| 2013/0316795 A1 | 11/2013 | Vogel |
| 2013/0342527 A1 | 12/2013 | Molyneaux et al. |
| 2014/0235346 A1 | 8/2014 | Kim et al. |
| 2014/0249961 A1 | 9/2014 | Zagel et al. |
| 2014/0274370 A1 | 9/2014 | Shah |
| 2015/0105161 A1 | 4/2015 | Sumaki et al. |
| 2015/0213646 A1 | 7/2015 | Ma et al. |
| 2015/0302505 A1 | 10/2015 | Di et al. |
| 2015/0339532 A1 | 11/2015 | Sharma et al. |
| 2016/0005270 A1 | 1/2016 | Marr et al. |
| 2016/0067612 A1 | 3/2016 | Ntoulas et al. |
| 2017/0259177 A1 | 9/2017 | Aghdaie et al. |
| 2017/0312634 A1 | 11/2017 | Ledoux et al. |
| 2017/0365102 A1 | 12/2017 | Huston et al. |
| 2018/0001216 A1 | 1/2018 | Bruzzo et al. |
| 2018/0161673 A1 | 6/2018 | Pasternack et al. |
| 2018/0161682 A1 | 6/2018 | Myhill |
| 2018/0169526 A1 | 6/2018 | Aghdaie et al. |
| 2018/0243656 A1 | 8/2018 | Aghdaie et al. |
| 2019/0087965 A1 | 3/2019 | Datta |
| 2019/0184286 A1 | 6/2019 | Du et al. |
| 2019/0197402 A1 | 6/2019 | Kovacs et al. |
| 2019/0294881 A1 | 9/2019 | Polak et al. |
| 2019/0354759 A1 | 11/2019 | Somers et al. |
| 2019/0388789 A1 | 12/2019 | Aghdaie et al. |
| 2020/0078685 A1 | 3/2020 | Aghdaie et al. |
| 2020/0193671 A1 | 6/2020 | Tamir |
| 2020/0306640 A1 | 10/2020 | Kolen et al. |
| 2020/0342677 A1 | 10/2020 | Molyneaux et al. |
| 2021/0001229 A1 | 1/2021 | Somers et al. |
| 2021/0008456 A1 | 1/2021 | Somers et al. |
| 2021/0027119 A1 | 1/2021 | Skuin et al. |
| 2021/0086083 A1 | 3/2021 | Aghdaie et al. |

FOREIGN PATENT DOCUMENTS

| | | |
|---|---|---|
| KR | 10-2012-0052228 | 5/2012 |
| KR | 10-2013-0118433 A | 10/2013 |
| KR | 10-2014-0033088 | 3/2014 |
| KR | 101603681 B1 | 3/2016 |
| KR | 10-2016-0115959 | 10/2016 |
| KR | 10-2016-0145732 | 12/2016 |

OTHER PUBLICATIONS

Aristidou et al., "Inverse Kinematics Techniques in Computer Graphics: A Survey," Comp Graphics Forum, vol. 00:1-24 (2017).

Bengio, et al, Curriculum Learning, Proceedings of the 26th International Conference on Machine Learning, 2009, in 8 pages.

Biggs et al., "Creatures Great and SMAL: Recovering the Shape and Motion of Animals from Video", Dec. 6, 2018, Springer, Computer Vision—ACCV: Asian Conference on Computer Vision 2018, pp. 3-19.

Chen et al., "Visualization System for Animating Vertebrate Animal Models", 2012, IEEE, 2012 Conference on Technologies and Applications of Artificial Intelligence, pp. 244-249.

Chou et al., "Self Adversarial Training for Human Pose Estimation", Nov. 15, 2018, APSI PA, Proceedings, APSI PA Annual Summit and Conference 2018, pp. 17-30.

Davis et al., "A Sketching Interface for Articulated Figure Animation," Eurographics—SIGGRAPH Symp on Comp Animation (2003).

Donges, Niklas, Transfer Learning—Towards Data Science, Apr. 23, 2018, https://towardsdatascience.com/transfer-learning-946518f95666.

Du et al., "Hierarchical Recurrent Neural Network for Skeleton Based Action Recognition", Jun. 2015, IEEE, The IEEE Conference on Computer Vision and Pattern Recognition (CVPR) 2015, pp. 1110-1118.

Ho, et al., Generative Adversarial Imitation Learning, pp. 1-14, arXiv:1606.03476v1 [cs.LG]; Jun. 10, 2016.

Isola et al., "Image-to-Image Translation with Conditional Adversarial Networks," BAIR Lab, UC Berkeley (Nov. 26, 2018).

Kanazawa et al., "Learning Category-Specific Mesh Reconstruction from Image Collections", 2018, The European Conference on Computer Vision (ECCV), pp. 371-386.

Mehta et al., "Vnect: Real-time 3D Human Pose Estimation with a Single RGB Camera," ACM Transactions on Graphics, vol. 36:4 (Jul. 2017).

(56) References Cited

OTHER PUBLICATIONS

Pittman, "The Pac-Man Dossier," Gamasutra, downloaded on Jun. 1, 2018, available at «https://web.archive.org/web/20161107115846/https://www.gamasutra.com/view/feature/3938/the_pacman_dossier.php?print=1».

Pruett, "Defining the All-Important Difficulty Curve," J of Ed, Comm & Value, vol. 8:1, Jan.-Feb. 2008, http://commons.pacificu.edu/cg i/viewcontent.cg i?article= 1002&context=inter08.

Shih et al., "Video-based Motion Capturing for Skelton-based 3D Models," National Taiwan University.

Shorten, "Image-to-Image Translation with Conditional Adversarial Networks," Pix2Pix, https://towardsdatascience.com/pix2pix.869c17900998?gi=e4c177e8a7c7 (Jan. 29, 2019).

Van de Panne, "Control for Simulated Human and Animal Motion," Dept Comp Sci, University of Toronto (1998).

Zweng et al., "Unexpected Human Behavior Recognition in Image Sequences using Multiple Features", Aug. 26, 2010, IEEE, 2010 20th International Conference on Pattern Recognition, pp. 368-371.

SYSTEMS AND METHODS FOR AUTOMATICALLY MEASURING A VIDEO GAME DIFFICULTY

REFERENCE TO RELATED APPLICATIONS

Any and all applications for which a foreign or domestic priority claim is identified in the Application Data sheet as filed with the present application are hereby incorporated by reference under 37 CFR 1.57 and made a part of this specification.

BACKGROUND

Software game developers typically desire for their video game to engage users for as long as possible. The longer a user is engaged with the software, the more likely that the video game will be successful. The longer a user plays a particular video game, the more likely that the user enjoys the video game, and thus, the more likely the user will continue to play the video game. Often, video games that are too difficult or too easy will result in less enjoyment for a user. Consequently, the user is likely to play the video game less. Thus, one of the challenges of game development is to accurately measure difficulties of various aspects of a video game and design the video game with a difficulty level that is most likely to keep a user engaged for a longer period of time.

SUMMARY OF EMBODIMENTS

The systems, methods, and devices of this disclosure each have several innovative aspects, no single one of which is solely responsible for the all of the desirable attributes disclosed herein.

One embodiment discloses a system for automatically measuring at least one game difficulty metric within a virtual game application, the system comprising: an artificial intelligence system configured to simulate gameplay sessions of a game application using a plurality of game agents, wherein each game agent of the plurality of game agents is configured to: during runtime of a gameplay session of the game application, identify a current gameplay state in a virtual game environment of the game application; identify one or more available actions associated with the current gameplay state; select an action of the one more available actions based at least in part on defined operational characteristics of the game agent; and execute the selected action within the virtual game environment; a telemetry data acquisition system configured to: record telemetry data associated with the plurality of game agents while the plurality of game agents is executing within the game application, the telemetry data comprising gameplay state information describing actions performed by the game agents at gameplay states during the gameplay sessions; and communicate the telemetry data to a data store; a data analysis system configured to: access the telemetry data associated with the plurality of game agents; calculate at least one game difficulty metric associated with each gameplay session based at least in part on the telemetry data; and generate a result for a game difficulty determination based on the game difficulty metric, wherein the result comprises a game difficulty determination for at least a defined segment of the game application; and a reporting system configured to: access the result for the game difficulty determination; generate a report based on the result for the game difficulty determination; and communicate the report to a computing system for display.

Another embodiment discloses a method for automatically measuring a game difficulty metric within a game application, the method comprising: recording telemetry data associated with an artificial intelligence system configured to simulate gameplay sessions of a game application using a plurality of game agents, wherein each game agent of the plurality of game agents is configured to: during runtime of a gameplay session of the game application, identify a current gameplay state in a virtual game environment of the game application; identify one or more available actions associated with the current gameplay state; select an action of the one more available actions based at least in part on defined operational characteristics of the game agent; and execute the selected action within the virtual game environment; accessing the telemetry data associated with a plurality of game agents, wherein the telemetry data comprises gameplay state information describing actions performed by the game agents at gameplay states during the gameplay sessions; calculating at least one game difficulty metric associated with each gameplay session based at least in part on the telemetry data; and generating a result for a game difficulty determination based on the game difficulty metric, wherein the result comprises a game difficulty determination for at least a defined segment of the game application; generating a report based on the result for the game difficulty determination; and communicating the report to a computing system for display.

A non-transitory computer-readable storage medium having stored thereon instructions that, when executed, direct a computing system to implement a game metric analysis system, the game metric analysis system configured to: record telemetry data associated with an artificial intelligence system configured to simulate gameplay sessions of a game application using a plurality of game agents, wherein each game agent of the plurality of game agents is configured to: during runtime of a gameplay session of the game application, identify a current gameplay state in a virtual game environment of the game application; identify one or more available actions associated with the current gameplay state; select an action of the one more available actions based at least in part on defined operational characteristics of the game agent; and execute the selected action within the virtual game environment; access the telemetry data associated with the plurality of game agents, wherein the telemetry data comprising gameplay state information describing actions performed by the game agents at gameplay states during the gameplay sessions; calculate at least one game difficulty metric associated with each gameplay session based at least in part on the telemetry data; and generate a result for a game difficulty determination based on the game difficulty metric, wherein the result comprises a game difficulty determination for at least a defined segment of the game application; generate a report based on the result for the game difficulty determination; and communicate the report to a computing system for display.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements.

The drawings are provided to illustrate embodiments of the subject matter described herein and not to limit the scope thereof.

DETAILED DESCRIPTION OF EMBODIMENTS

I. Overview

Figure 1:
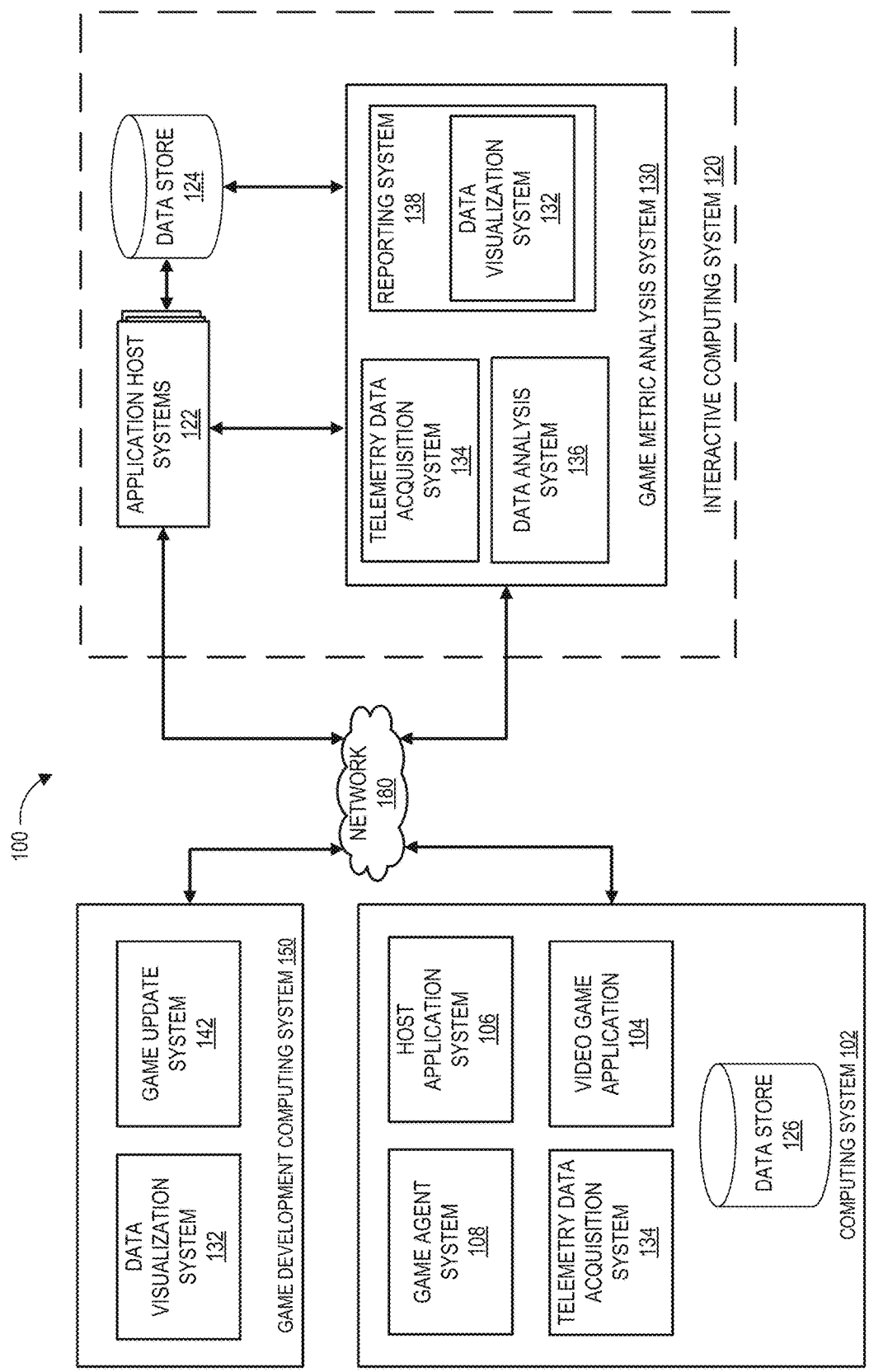
FIG. 1 illustrates an embodiment of a computing environment for automatically measuring difficulty metrics in a video game.

Inconsistent difficulties among various aspects of a video game may cause a game player to lose interest. As an example, the difficulty of a level of the video game may be out of line with the rest of the levels. When a level is too difficult compared to the rest of the levels, a vast majority of game players may fail to complete the level and may therefore lose interest in the whole video game. In order to adjust difficulties in the video game, the game developers may need to accurately measure difficulty metrics of various aspects of the video game before the video game is released. The game developers may set aside a beta period for people to test the video game. However, the beta period may be only for a small group of people and therefore the video game difficulty data acquired may be inaccurate due to the small sample size. For example, the beta period may involve people who are very good at the video game compared to the rest of the population. Therefore, the resulting difficulty adjustment to the video game may still be too difficult for the rest of the game players. In addition, obtaining difficulty metric data from actual players after the video game is released may cause player frustration and endanger the gameplay. For example, game players might drop out before an adjustment of video game difficulty can be employed.

The techniques described herein can provide a more accurate measurement of the game difficulty metrics. In some embodiments, a fleet of game agents may automatically execute within a game application by interfacing with the video game application's application programming interface (API) or by automating an interaction with the video game application (such as automating an input from a keyboard, a mouse, a game controller, or user touch screen interactions). The fleet of game agents may be run in a batch mode or one at a time. To save computing resources and improve the execution speed, the video game application may be configured not to render graphics while the game agents are executing the video game application or other processes/interactive features which do not affect gameplay. In some implementations, the video game application may be run in a speed-up mode while the fleet of game agents are executing.

The telemetry data associated with the gameplay of each game agent may be recorded. Advantageously, the telemetry data may include intermediary information such as state transition information. The telemetry data may be communicated to a data analysis system which can calculate game difficulty metrics for various aspects of the video game, such as, for example, different levels (or stages), chances of a certain item or in-game character appearing, chances of a certain in-game action, and so forth. The data analysis system can determine game difficulty associated with the various aspects based on the game difficulty metrics. The results from the data analysis system may be visualized in a report and be communicated to a game developer for updating the operations of the video game application to adjust the video game's difficulty level.

II. Examples of Automatically Measuring Game Difficulty Metrics

FIG. 1 illustrates an embodiment of a computing environment 100 for automatically measuring a video game's difficulty metrics. The computing environment 100 includes a network 180, a computing system 102, a game development computing system 150, and an interactive computing system 120. To simplify discussion and not to limit the present disclosure, FIG. 1 illustrates only one computing system 102, one game development computing system 150, and one interactive computing system 120, though multiple systems may be used.

The interactive computing system 120 can include application host systems 122, one or more data stores 124, and a game metric analysis system 130. The game metric analysis system 130 can communicate with data store 124 and/or with the application host systems 122 to acquire data associated with a video game application 104. The game metric analysis system 130 can communicate with computing system 102, and game development computing system 150 via the network 180. Although only one network 180 is illustrated, multiple distinct and/or distributed networks 180 may exist. The network 180 may include a local network. For example, the computing system 102, the interactive computing system 120, and the game development computing system 150 may all be associated with a backend game development system.

One or more of the systems described herein may be associated with the analysis of a video game application 104. For example, the computing system 102 can be configured to execute the video game application 104, simulate the gameplay with the game agent, and/or acquire data (such as, for example, telemetry data) of the video game application 104. The game development computing system 150 can be configured to show analyses of the video game application 104. The game metric analysis system 130 may process the data acquired by the computing system 102 and communicate the results of the data analyses to the game development computing system 150.

A game developer may use the computing system 102 to acquire data of the video game application 104, use the game metric analysis system 130 to analyze the game difficulty metrics, and use the game development computing system 150 to adjust video game's operations based on the analysis from the game metric analysis system 130. For example, in some embodiments, a game agent can simulate the gameplay of the video game application 104 on the computing system 102. The telemetry data acquisition system 134 of the computing system 102 can capture data associated with a gameplay session of the video game application 104. The computing system 102 can communicate the captured data to the game metric analysis system 130. The game metric analysis system 130 can compile data generated by multiple gameplay sessions and/or by multiple game agents and analyze the game difficulty metrics based on the compiled data. The game metric analysis system 130 can generate a report of game difficulty metrics for various aspects in the video game (such as at different levels in the video game) and communicate the report to the game development computing system 150. The game development computing system 150 or a game developer using the game development computing system 150 can update the operations of the video game based on the report.

Though illustrated as separate systems, the game metric analysis system 130 can be part of the computing system 102. In some embodiments, the game development computing system 150, the computing system 102, and the game metric analysis system 130 can all be part of the same system. For example, the combined system may reside on one or more hardware systems configured for backend game development and testing.

A. Computing System

The computing system 102 can include a video game application 104, a game agent system 108 configured for simulating a gameplay with a plurality of game agents, a host application system 106 for hosting at least a portion of the video game application 104, a telemetry data acquisition system 134 for acquiring telemetry data of the video game application 104, and a data store 126 configured to store information associated with the video game application 104, such as game assets, telemetry data, as well as instructions for executing the video game application 104 and for acquiring data of the video game application 104.

Figure 8:
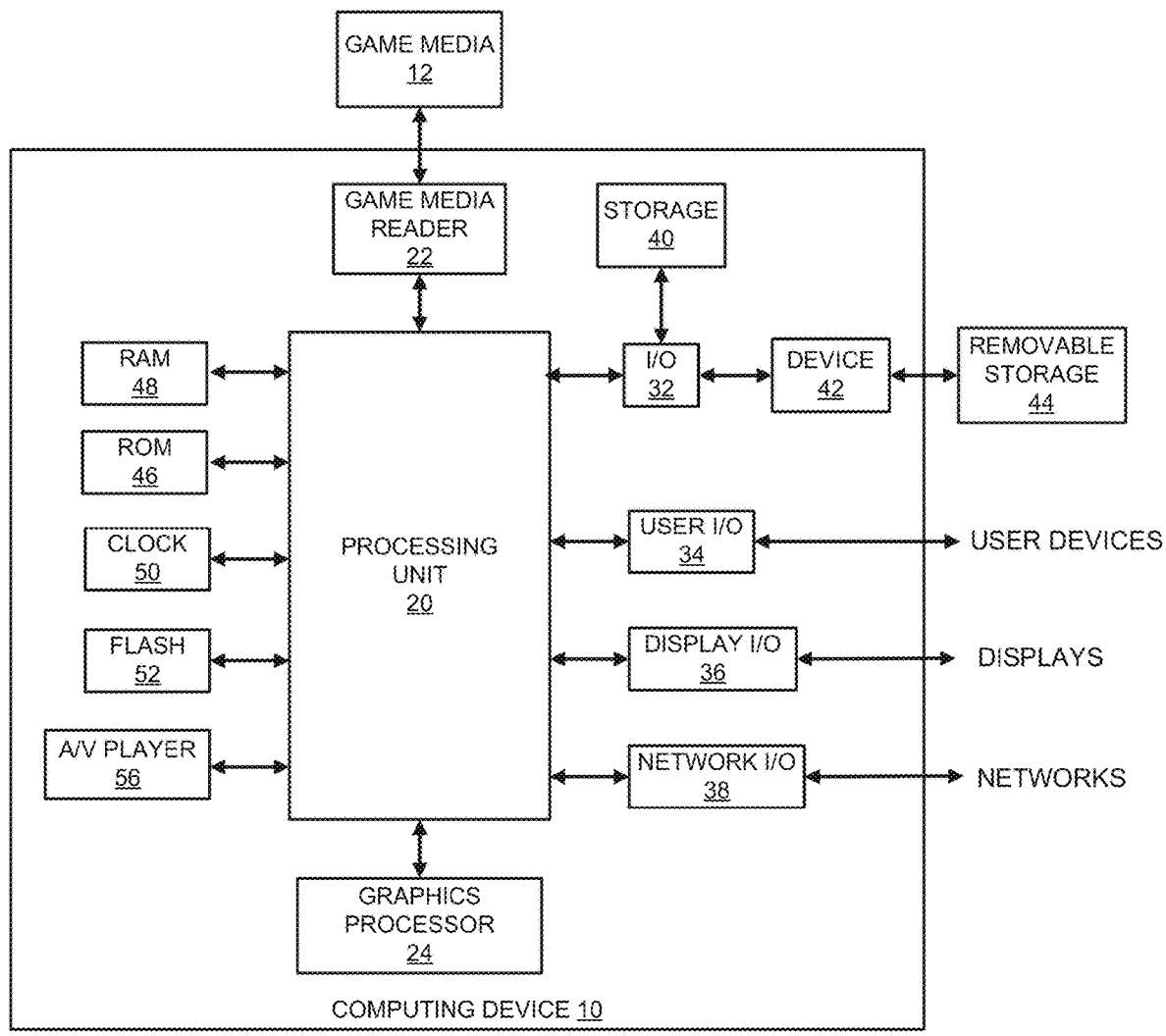
FIG. 8 illustrates an embodiment of a computing device.

The computing system 102 may be implemented on the computing device 10 (shown in FIG. 8). The computing system 102 may include hardware and software components for establishing communications over a communication network 180. For example, the computing system 102 may be equipped with networking equipment and network software applications that facilitates communications via one or more networks (for example, the Internet or an intranet). The computing system 102 may have varied local computing resources such as central processing units and architectures, memory, mass storage, graphics processing units, communication network availability and bandwidth, and so forth. Further, the computing system 102 may include any type of computing system, such as, for example, desktops, laptops, game application platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the computing system 102 may include one or more of the embodiments described below with respect to FIG. 8.

1. Video Game Application and Host Application System

Typically, the computing system 102 is capable of executing a video game application 104 which may be stored or executed in a distributed environment. For example, the video game application may be executed by a virtual machine, or a virtual server instance executing the game application in the virtual environment. In certain implementations, the computing system 102 may execute a portion of a video game and the interactive computing system 120, or an application host system 122 of the interactive computing system 120 may execute another portion of the video game. For instance, the video game application 104 may be a massively multiplayer online role-playing game (MMORPG) that includes a client portion executed by the computing system 102 and a server portion executed by one or more application host systems 122. In some embodiments, the video game application 104 can include a distributed application or an application that includes a portion that executes on the computing system 102 and a portion that executes on at least one of the application host systems 122.

The computing system 102 may execute a host application system 106. The host application system 106 can act as an interface or hub for one or more video game applications 104 that interfaces with the application host system 122. The host application system 106 can be loaded into memory on the player computing system 102.

2. Game Agent System

The game agent system 108 may be an artificial intelligence (AI) system. The game agent system 108 can include one or more game agents. A game agent can have certain characteristics. A game agent can automatically make decisions at various states of the video game application 104. The game agent system 108 may have various types of agents with each type of agent being associated with defined characteristics. For example, a game agent system 108 may include a random agent, a static agent, a learning agent, a combination thereof, and/or other types of agents. A random agent can take a random action at each state in the video game. A static agent can be designed to implement a static predefined AI. For example, the static agent can follow a predefined path within a video game application, implement predetermined actions, and/or respond to game states based on a predetermined set of operational rules. In one example, the static agent may be designed to move around a map in a certain way in a first person exploration video game. As another example, the static agent may be designed to follow a certain series of moves in a turn-based game. A learning agent can be configured to dynamically change the rule set governing the operation of the agent over time. For example, the learning agent can learn levels and maps as it plays the video game application 104. The learning agent may not have a predefined path. It can adjust its actions based on acquired information, such as previously failed attempts or previous levels in the video game. For example, a learning agent may have an exploration phase. During which the learning agent can see which moves are available. A learning agent can consider objectives or rewards collected or available at certain states in the video game application 104 and make a decision based on the objectives or rewards.

In some embodiments, the game agent's characteristics may include a level (also referred to as AI level). For example, the AI level may include qualitative grades such as low, medium, or high or quantitative grades, such as for example, in a scale of 1 to 10 with 10 being the hardest (or easiest). The AI level may correspond to the intelligence level of the game agent. For example, a high AI level may indicate that the game agent is "smarter" and therefore, can pass more game level or pass a game level in a shorter period of time. On the other hand, a low AI level may indicate that the game agent is "dumber" and therefore, can pass fewer game levels or take longer to pass a game level. As another example, a learning agent with a high AI level can learn a level more quickly while a learning agent with a low AI level may learn a level slowly. The game agent system 108 can be used to play the video game application 104. The game agent system 108 can execute within the video game application 104 by interfacing with the API of the video game application 104. For example, a game agent of the game agent system 108 can perform an action in the video game by calling the API associated with the action. Additionally or alternatively, the game agent system 108 can interact with the video game application 104 by simulating an action of a peripheral device. For example, the game agent system 108 (and/or the game agents of the game agent system 108) can simulate a mouse click, a mouse movement, a keyboard stroke, or other movements of a game controller. The graphics of the video game application 104 may not rendered when the game agent system 108 interacts with the video game application 104 via the API. When the game agent system 108 executes within the video game application 104 by simulating an action of a peripheral device, the video game application 104 may be configured to render graphics. For example, a game agent may be configured to only click on a certain spot of the screen.

The characteristics of the agents may also include personas where agents may be trained to mimic the choices of a person at a particular state. The agents can have different personas. For example, one agent can use game currency to rush through the game while another tries to win with no currency spent. The agent personas may be trained using logs collected from gameplays of quality assurance ("QA") personnel. The QA logs may be used to generate a set of seed data for training the agent, where the QA logs may be analyzed to identify a probability of making a certain choice given a particular game state. The computing system 102 can compile the probabilities of the game states to generate a persona. For example, a persona may be rich because the QA logs indicate that a person spends a lot of game currency to pass levels. The persona may also be stingy because the person recorded in the QA logs tries to win with no currency spent. The game agent system 108 may select a persona for the game agent at each run of the gameplay. The game agent system 108 can select a persona randomly or based on a certain probability. Agent personas can control the choices made by agent in each game state. For example, if the rich persona is selected for a game agent, the game agent may have a high probability of spending game currency at a game state.

At each state within the video game application, a game agent in the game agent system 108 can make an action based on its operational characteristics. The action may be a random action chosen from a pool of available actions at that state, a predefined option, or an informed action based on the available information (such as, for example, data received in the current and/or previous gameplay sessions).

Multiple game agent systems may be used to simulate a gameplay. For example, in a video game for football, each game agent may play a team. As another example, in a single player turn-based game, a game agent may simulate the gameplay as if it is a human. Each game agent system 108 may include game agents with similar types or characteristics. For example, one game agent system 108 may include learning agents while another game agent system 108 may include random agents. A game agent system 108 may also include game agents with mixed types or characteristics. For example, the game agent system 108 may include static agents for farming and learning agents for attacking or defending. The game agent systems 108 or game agents in a game agent system 108 may be located in one or more computing systems 102. For example, the game agent system 108 having learning agents may be executed by a different computing device than the game agent system having random agents.

As further described with reference to the telemetry data acquisition system 134, as a game agent system 108 plays the video game application 104, the game agent's actions as well as the results of the actions can be recorded by the telemetry data acquisition system 134. Although in this example, only one game agent system 108 is shown, the computing system 102 can simulate a gameplay session by running multiple game agents systems 108 in series or in parallel by running multiple instances of the video game or multiple agents within a video game.

3. Telemetry Data Acquisition System

Telemetry data acquisition system 134 can be configured to acquire telemetry data during a gameplay session. Telemetry data of a video game application can be used to recreate a game state and to analyze issues during game development. Telemetry data may include results of an action such as, for example, the ending state of the game agent, the starting state of the game agent, the number of lives, rewards collected at the end of the video game, and so on. The telemetry data may also include intermediary data such as step-by-step state transition information. The state transition information can include state representations, such as, for example, the objects (such as the type and the number of boosters) available, or the game agent's location, speed, or other attributes. The state transition information can also include moves available at a given state.

As an example, in a turn-based game, the step-by-step state transition information may include serializations at various turns. At the beginning of the game, the gameplay area may include a blue gem on the top left, a red gem next to the blue gem, and a green gem in the middle of the gameplay area. Then, the game agent system 108 can make a move causing new gems to be created and fill up the gameplay area. As another example, in a video game for football, the state transition information may include locations of the game agents (such locations with respect to the ball), the speed of the game agents, the attributes of the game agents, and so on, at various states of the video game. Additional examples of state transition information are described with reference to FIG. 3.

Telemetry data can be stored in a variety of database formats. The telemetry data can be transformed into statistics for analyzing the video game application, such as analyzing difficulty metrics of various levels or game states. The telemetry data may be transformed or organized to show various metrics or statistics associated with a video game application, such as, for example, average completion time as a function of individual game level, the game progression speed, scores and rewards, how fast a leaning agent can learn a level, and so on. These statistics can sometimes be referred to as game metrics or game difficulty metrics.

The telemetry data acquisition system 134 may be implemented as a plug-in of the video game application 104 or the host application system 106 or as a standalone program. In some embodiments, the telemetry data acquisition system 134 may be part of the game agent system 108 for acquiring telemetry data associated with the game agent system 108.

As further described with reference to game metric analysis system 130, a portion of the telemetry data acquisition system 134 can reside with the game metric analysis system 130 while another portion can reside on the computing system 102. For example, a portion of the video game application 104 may be executed at the computing system 104 while another portion may be executed by the application host systems 122 at the interactive computing system. The telemetry data acquisition system 134 on the computing system 102 can acquire the telemetry data of the portion of the video game application as being executed on the computing system 102. In the meantime, the telemetry data acquisition system 134 on the interactive computing system 120 can acquire the telemetry data of the other portion of the video game application as being executed by the application host systems 122.

As another example, the telemetry data acquisition system 134 of the computing system 102 can acquire telemetry data associated with the game agent system 108 and communicate the telemetry data to the telemetry data acquisition system 134 of the game metric analysis system 130. In some embodiments, the telemetry data may be communicated together with information of the game agents, such as the type or the characteristics of game agents. The telemetry data acquisition system 134 can compile data acquired from multiple computing systems, during multiple gameplay sessions, as well as data associated with multiple game agents. The telemetry data acquisition system 134 can communicate the compiled data to the data analysis system 136 for computation of the game difficulty metrics. Although in this example, the game metric analysis system 130 is illustrated as a separate system from the computing system 102, the game metric analysis system 130 can also be part of the computing system 102. In such situations, the telemetry data acquisition system 134 may reside in one of the computing system 102 or the interactive computing system 120.

4. Data Store

The data store 126 can be configured to store information associated with the game agents of the game agent system 108, such as the type of the game agents or the characteristics of the game agents. The data store 126 can also store the telemetry data acquired by the telemetry data acquisition system 134 over one or more gameplay sessions. The data store 126 can further store instructions associated with the host application system 106 and video game application 104. For example, the data store 126 can store game assets (such as the virtual worlds) and game logics of the video game application 104.

In some embodiments, the data store 126 may be combined with data store 124. For example, when the game metric analysis system 130 is part of the computing system 102, various systems of the computing system 102 and interactive computing system 120 may be configured to communicate with the combined data store.

B. Interactive Computing System

In the computing environment 100, the interactive computing system 120 can include application host systems 122, a data store 124, and a game metric analysis system 130. These systems may be configured to communicate with each other. For example, the game metric analysis system 130 can obtain data associated with a video game application 104 from the application host systems 122 and can store such data in the data store 124. The application host systems 122 can communicate with the data store 124 to execute and/or host a video game application.

1. Application Host Systems

Application host systems 122 can be configured to execute a portion of the video game application 104 and/or host application 106. In certain embodiments, instead of or in addition to executing a portion of the video game application 104 and/or host application 106, the application host systems 122 may execute another application, which may complement and/or interact with the video game application 104 during execution of an instance of the video game application 104.

For example, the interactive computing system 120 may enable multiple game agents or computing systems to access a portion of the video game application 104 and/or host application 106 executed or hosted by the interactive computing system 120. In some embodiments, the portion of the video game application 104 executed by application host systems 122 of the interactive computing system 120 may create a persistent virtual world. This persistent virtual world may enable one or more game agents to interact with the virtual world and with each other in a synchronous and/or asynchronous manner. In some cases, multiple instances of the persistent virtual world may be created or hosted by the interactive computing system 120. A set of game agents may be assigned to or may access one instance of the persistent virtual world while another set of game agents may be assigned to or may access another instance of the persistent virtual world. In some embodiments, the application host systems 122 may execute a hosting system for executing various aspects of a game environment. For example, in one embodiment, the video game application 104 may be a competitive game, such as a first person shooter or sports game, and the host application system 122 can provide a dedicated hosting service for hosting multiplayer game instances or facilitate the creation of game instances hosted by computing devices. In some embodiments, the application host systems 122 can provide a lobby or other environment for players (or game agents) to virtually interact with one another. Such environments may include environments for conducting transactions between players, such as an auction house or type of environment for facilitating transactions.

2. Data Store

The interactive computing system 120 can include a data store 124. The data store 124 can be configured to store data acquired by other systems, such as, for example, telemetry data, video game application 104, or information about the game agents of the game agent system 108. The data store may be distributed across multiple computing devices (see for example computing device 10 in FIG. 8). For example, the data store 126 of the computing system 102 may be part of the data store 124 of the interactive computing system 120. In some embodiments, the data store 124 may be network-based storage system where data may be stored in different locations.

3. Game Metric Analysis System

As described with respect to other systems in FIG. 1, the game metric analysis system 130 can communicate with other systems to acquire data associated with a game application and to analyze the data. The game metric analysis system 130 can include one or more systems for data acquisition and analysis. For example, the game metric analysis system 130 can include a telemetry data acquisition system 134, a data analysis system 136, and a data reporting system 138 (which can include a data visualization system 132). These example systems are not intended to be limiting. The game metric analysis system 130 may include fewer or more systems than described.

The game metric analysis system 130 and its various systems may be distributed across multiple computing systems. The various systems of the game metric analysis system 130 can communicate with each other to obtain and analyze data associated with a game application. For example, the telemetry data acquisition system 134 can acquire telemetry data when a game agent of the game agent system 108 is playing the video game application 104. The telemetry data acquisition system 134 can communicate the acquired telemetry data to the data analysis system 136 for analysis of the game difficulty metrics. The data analysis system 136 can communicate the results of the analysis to the reporting system 138 which may visualize the result of the analysis via the data visualization system 132 and/or generate a report for the analysis. Each system of the game metric analysis system 130 will be described in more detail below.

i. Telemetry Data Acquisition System

As described with reference to the computing system 102, the telemetry data acquisition system 134 can record telemetry data, which may include game state transition information when a game agent of the game agent system 108 is playing the video game application 104. A portion of the telemetry data acquisition system 134 may be executed by the computing system 102, while another portion of the telemetry data acquisition system 134 may be executed by the interactive computing system 120. The telemetry data acquisition system 134 of the game metric analysis system 130 may communicate with the telemetry data acquisition system 138 of the computing system 102 to acquire telemetry data. For example, there may be multiple game agents each executing in its own instance of the game application. The telemetry data acquisition system 134 on each computing system can acquire telemetry data associated with the respective agent, and the telemetry data acquisition system 134 of the interactive computing system 120 can combine the telemetry data acquired from multiple agents operating on multiple computing systems.

In some embodiments, the telemetry data acquisition system 134 may be implemented entirely by the interactive computing system 130. For example, in situations where the computing system 102 is implemented as part of the interactive computing system 120, the interactive computing system 120 can simulate the gameplay using a game agent. In other embodiments, the telemetry data acquisition system 134 may be entirely implemented by the computing system 102 or implemented by both.

The telemetry data acquired by the telemetry data acquisition system 134 may be stored in the data store 124/126. The telemetry data may also be communicated to the data analysis system 136 for analysis.

ii. Data Analysis System

The data analysis system 136 can calculate game metrics based on the telemetry data acquired by the game agents and determine difficulty metrics of various game levels based on the calculated game metrics for the respective game levels. The data analysis system 136 can obtain the telemetry data from the telemetry data acquisition system 134 and/or from the data store 124. The data analysis system 136 can use telemetry data to calculate various game metrics and use the game metrics associated with a group of game agents to measure the difficulty metrics of a game level. The telemetry data may include data from game agents with different types and characteristics. The data analysis system 136 can evaluate game difficulty metrics by dividing game agents into different groups with each group associated with one or more types or characteristics. For example, the data analysis system 136 can compute a game metric based on telemetry data obtained from a group of game agents whose AI level is high. As another example, data analysis system 136 can compute a game metric based on telemetry data associated with a group of learning agents. Statistics associated with a game metric may be compared with a threshold condition or one or more rules for determining a game difficulty. For example, the threshold condition may be a percentage such as the percentage of game agents who failed the level. The threshold condition may also be other quantitative or qualitative measures. For example, the threshold condition may be the time it takes for a learning agent to learn the level or the average number of attempts for a group of game agents.

The difficulty metrics of a game level may be measured by the absolute performance of a game agent. For example, in some rules a game level may be indicated as difficult when a game agent having a high AI level cannot pass the game level. On the other hand, in other rules, a game level may be indicated as easy when a game agent having a low AI level can pass it.

The difficulty metric of a game level may also be determined using rules based on the relative performance across multiple agents. For example, data analysis system 136 can measure the win ratio. If 90% of the game agents pass a certain game level, the data analysis system 136 may include a rule that concludes that this level is easy. On the other hand, if only 5% of the agents pass this game level, the data analysis system 136 may a rule that concludes that the level is hard.

The data analysis system 136 can also look at the scores or rewards obtained by a game agent at the end of a level. For example, the data analysis system 136 may include rules that assign multiple threshold scores or rewards which correspond to different game difficulty levels. For example, if the average score of the game agents is below a certain threshold, the data analysis system 136 may determine that the game level is difficult. As another example, if the percentage of game agents collecting a certain type (or number) of rewards exceeds a threshold, the data analysis system 136 may determine that the game level is easy.

Additionally or alternatively, the data analysis system 136 can evaluate the progression speed, such as how long it takes for an agent to progress to the next level. For example, a game level may be more difficult if it takes a game agent a longer period of time to complete. On the other hand, a game level may be easier if it takes a game agent a relatively short period of time to finish.

Where learning agents are used, the data analysis system 136 can also calculate how fast a learning agent can learn a level. For example, if the learning agents can learn and pass a level within a threshold amount of time associated with a medium level of difficulty, the data analysis system 136 may apply a rule to determine that the level is of medium difficulty. The data analysis system 136 can group the learning agents into different groups based on the agent's characteristics. For example, if the data analysis system 136 can analyze how fast a group of learning agent with high AI level can pass a level and how fast a group of learning agent with low AI level can pass the level. The data analysis system 136 can use calculations for either or both groups and apply rules to determine the game difficulty levels.

As another example, the data analysis system 136 can calculate an average period of time for a group of learning agents to reach a threshold intelligence level. For example, the threshold intelligence level may be reached if the game agent knows how to fulfill an objective in a video game (such as defeating a monster). The data analysis system 136 can also measure the average attempts a group of agents tries before winning the level.

In addition to or in alternative to measuring difficulty metrics of a game level, similar techniques may also be used to measure the difficulty metrics of the overall video game application 104 or to measure the difficulty metrics of a certain state in the video game. For example, the data analysis system 136 can use the techniques described herein to measure the difficulty metrics related to beating a non-player character. As another example, the data analysis system can evaluate a difficulty or a challenge provided by the video game application 104 in response to a seed value. The seed value may be associated with the probability of an in-game object appearing (or disappearing), an action (or an inaction) by a non-player character, and so forth. The seed value may be generated by pseudorandom number generator or other means. The data analysis system 136 can determine how challenging a particular level or portion of the video game (such as a dungeon) is in response to a particular seed value in the video game application 104. For example, the data analysis system 136 can calculate how well a group of game agents do when the particular seed value is utilized. Advantageously, in certain embodiments, by evaluating the challenge provided by a particular seed value, the difficulty level of the video game application can be refined by adding or removing the seed value to a set of available seed values for a particular difficulty level. For example, if it is determined that a seed value causes the game agents to fail at an 80% rate, the seed value may be associated with a harder level than another seed value that causes users to fail at a 20% rate.

In some embodiments, the data analysis system 136 can also be configured to measure whether the game difficulty meets a certain expectation. The data analysis system 136 can compare the overall game difficulty or the difficulty of a level with a threshold condition. For example, the threshold condition may be based on a target progression rate. If the measured progression rate is lower than the targeted progression rate. The data analysis system 136 may determine that the current difficulty level does not meet the expectation. The data analysis system 136 can communicate the conclusion or the analysis to the reporting system 138 for presentation to the game development computing system 150.

iii. Reporting System

In some embodiments, the reporting system 138 can obtain the result of the analysis from the data analysis system 136 or access the result of the analysis from the data store 124. The reporting system 138 can generate a report and communicate the report to the game development computing system 150. The report may include the game metrics computed by the data analysis system 136 and a recommendation for updating the game's operation. The report may be presented in any format, such as a description, a figure, a video, an audio, and so on. For example, if the win ratio indicates that most game agents will pass a level, the report may include a recommendation for increasing the game's difficulty, for example, by adjusting the probability of obtaining a game item.

The reporting system 138 may include a data visualization system 132. The data visualization system 132 can generate a user interface for a user (such as game developer) to view data analyses associated with the video game application 104. The user interface may include analysis of the telemetry data and a filtering tool. The filtering tool may be configured to receive user input and filter data based on the user input or for the user to review only a portion of the result. For example, the filtering tool may allow a user to select the game difficulty metrics data for a specific level in the video game. The user interface may be rendered through a web interface (such as a webpage), and/or on an application locally installed on a computing device.

In some embodiments, a portion of the data visualization system 132 may be part of the interactive computing system 120, while another portion of the data visualization system 132 may be part of the game development computing system 150. For example, the portion that resides in the interactive computing system 120 may be configured to generate user interface data and communicate the user interface data to the data visualization system 132 at the game development computing system 150. The data visualization system 132 at the game developing computing system 150 can accordingly display the user interface data. In other embodiments, the game development computing system 150 and the game metric analysis system 130 may be part of the system. Therefore, the data visualization system 132 can directly present the result of the data analysis system 136 without needing to communicate the user interface data via a network.

C. Game Development Computing System

The game development computing system 150 can be implemented by a computing device 10 as described with reference to FIG. 8. The game computing system 150 can comprise a data visualization system 132 and a game update system 142. The game development computing system 150 can communicate with the computing system 102 and/or the interactive computing system 120 via the network 180. In some embodiments, the game development computing system 150 may be a part of the computing system 102 or the interactive computing system 120.

1. Data Visualization System

The data visualization system 132 of the game development computing system 150 can include a user interface. As described with reference to FIGS. 5A and 5B, the user interface can display one or more game metrics. The game metrics may be shown in various formats such as tables, word descriptions, graphs, or the like.

The data visualization system 132 may be implemented in a variety of ways such as, for example, a website, a mobile page, a plug-in to an application (such as, for example, a game development application, a game application, or a host application), and so on. The data visualization system 132 may be part of the data visualization system 132 of the game metric analysis system 130. In some embodiments, the game development computing system 150 may be part of the interactive computing system 120. The data visualization system may reside in the game development computing system 150 and/or the game metric analysis system 130.

2. Game Update System

The game update system 142 may be configured to automatically update the operation of the game based on the measured game difficulty metrics. For example, the game update system 142 can compare the measured game difficulty metrics of a level with a threshold condition and if the game difficulty of the level as determined from the game difficulty metrics passes the threshold condition (such as by being too easy or too difficult). The game update system 142 can automatically adjust one or more aspects of the video game application 104 to thereby adjust the game difficulty metrics of the video game application 104. As an example, if a level is too difficult, the game update system 142 can update a seed associated with a rare item in the video game to increase the probability of obtaining the item, which can reduce the game difficulty of that level.

Although the game update system 142 is shown to be part of the game development computing system 150, the game update system 142 may also be part of the computing system 102 or part of the interactive computing system 120. In some embodiments, the game update system may include another data store and a rules engine (not shown in FIG. 1). The rules engine may be configured to compare the game difficulty metrics with the threshold condition or the rules.

II. Examples Processes for Automatically Measuring Game Difficulty Metrics

Figure 2:
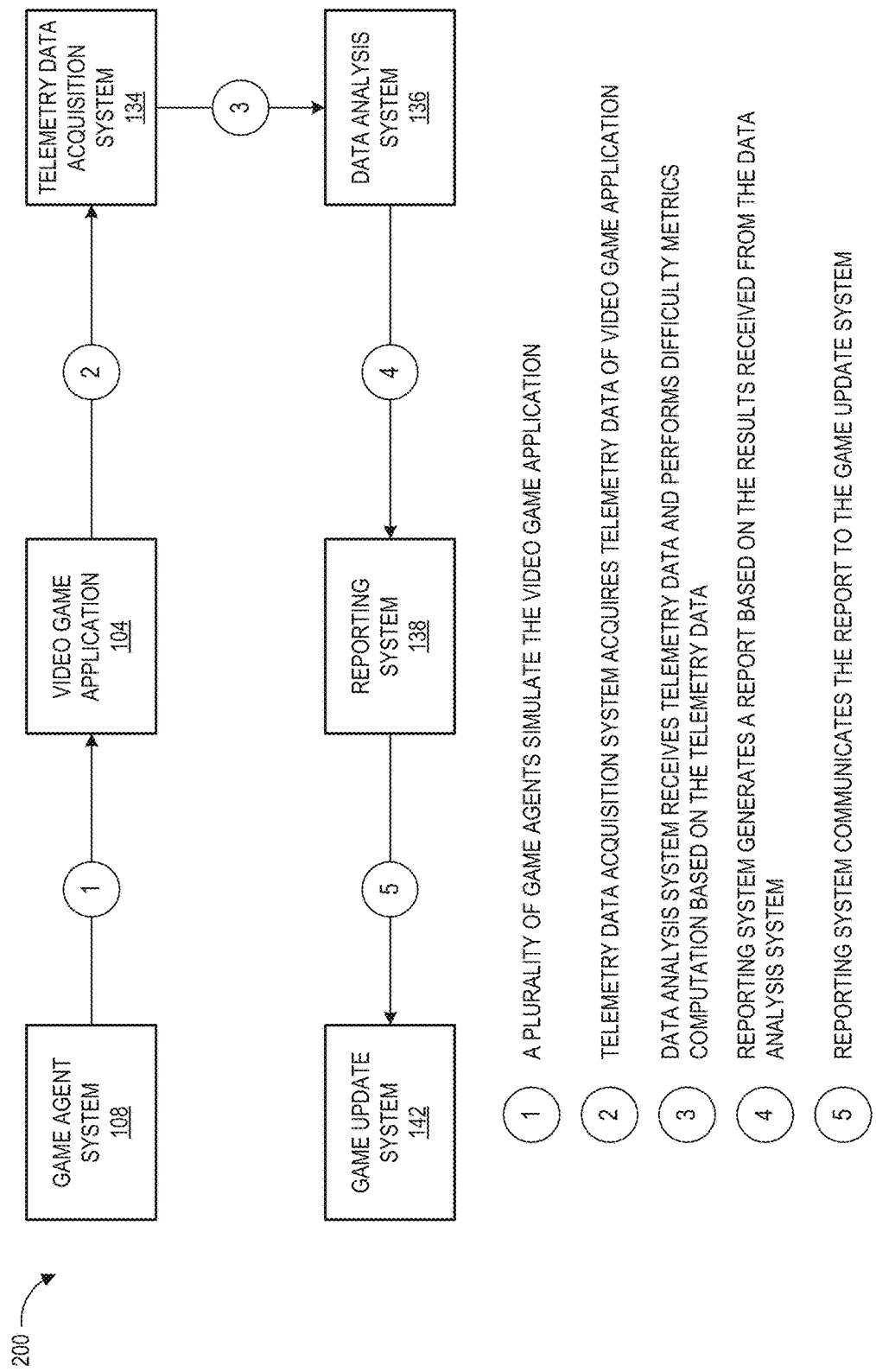
FIG. 2 illustrates an embodiment of a process for automatically measuring difficulty metrics in a video game.

FIG. 2 illustrates an embodiment of an example process for automatically measuring difficulty metrics of a video game. At (1) of the process 200, a game agent system 108 can execute within the video game application 104 and simulate gameplay of the video game application 104. For example, a game agent of the game agent system 108 may be configured to make a move at different decision points of the video game application 104.

At (2), the telemetry data acquisition system 134 can acquire telemetry data of the video game application 104 as the game agent system 108 is playing the video game application 104. The telemetry data may include the results of the game agent's action as well as intermediary data such as game state transition information and the game agent's actions for each state in the video game.

At (3), the data analysis system 136 can receive the telemetry data acquired by the telemetry data acquisition system 134. The data analysis system 136 can retrieve the telemetry data from a data store or in real-time as the telemetry data acquisition system 134 records the gameplay of the game agent system 108. The data analysis system 136 can perform game difficulty metrics computation based on the telemetry data. For example, the data analysis system 136 can calculate one or more game metrics using the telemetry data from multiple game agents and/or over multiple game play sessions. The game metrics can further be used to determine the difficulty of a game level, a game, or a game state, alone or in combination. For example, the values of a game metric may be evaluated against one or more threshold conditions or rules for determining the game difficulty metrics.

At (4), the reporting system generates a report based on the results received from the data analysis system 136. For example, the reporting system can compile the measured difficulty metrics for several levels and generate a graph showing the relative difficulty metrics for each level. As another example, the report may show whether the measured difficulty of a level meets a threshold condition.

At (5), the reporting system communicates the report to the game update system 142. The game update system 142 can automatically adjust one or more aspects of the video game's operation. For example, the game update system 142 can adjust the value of a seed in the video game based on one or more rules. The seed may be associated with a probability of an item or character showing or performing a certain action. The game update system 142 can also automatically remove or add one or more in-game item or character based on the report based on other rules. In some embodiments, a game developer may perform such adjustment through the game update system 142.

III. Examples of Game Agents and State Transition Information

Figure 3:
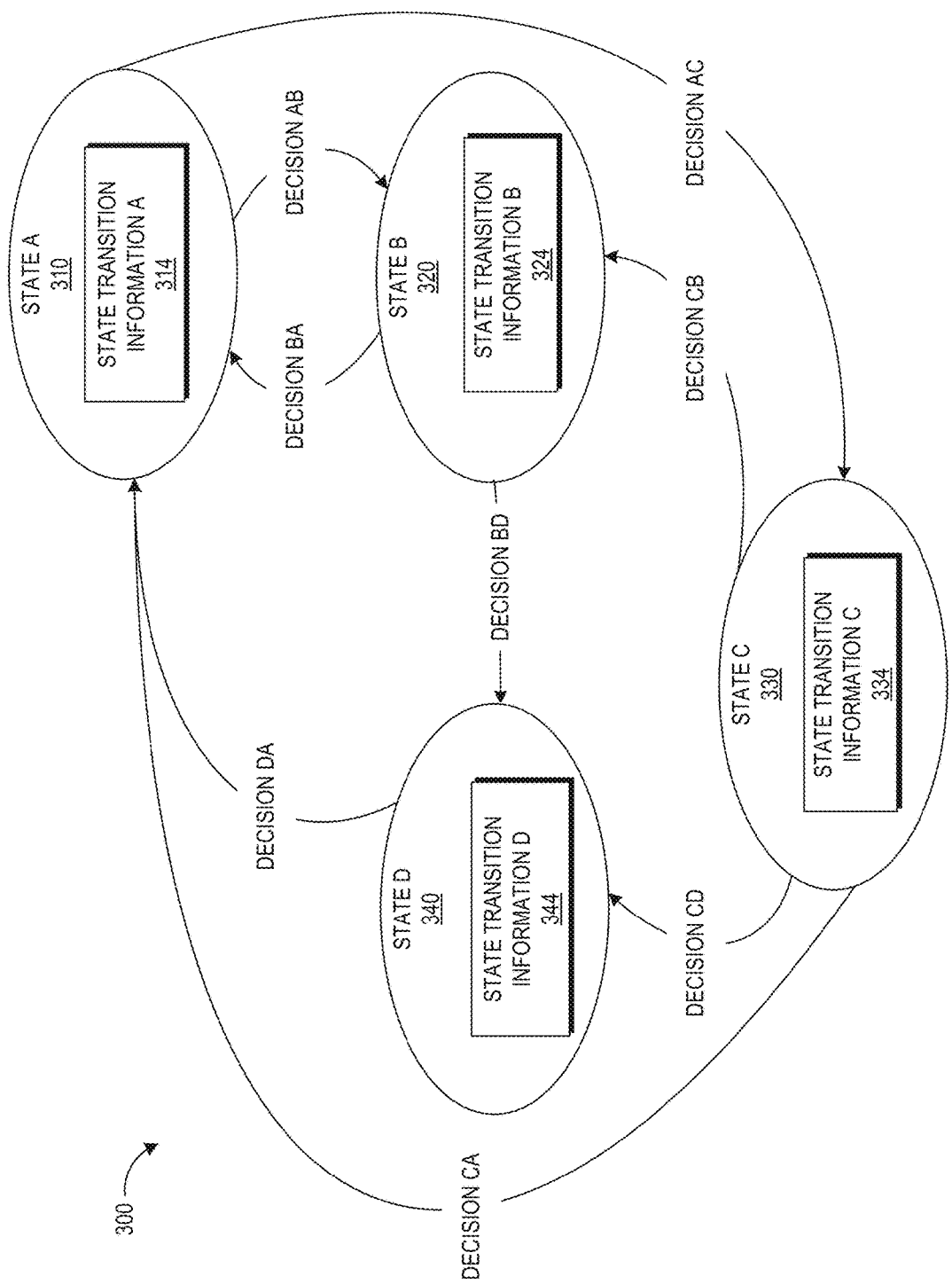
FIG. 3 illustrates an embodiment of state transitions in a video game.

FIG. 3 illustrates an embodiment of state transitions in a video game. In the example diagram 300, there may be four states in a video game: state A 310, state B 320, state C 330, and state D 340. Each state may include its corresponding state transition information. For example, the state transition information A 314 corresponds to the state A 310; the state transition information B 324 corresponds to the state B 320; the state transition information C 334 corresponds to the state C 330; and the state transition information D 344 corresponds to the state D 340. As described with reference to FIG. 1, state transition information may include state representation information associated with a game player or objects in that state, such as the objects available at a given state, player's current location, and so on. The state transition information may also include moves or decisions available at a given state.

After a game agent makes a move or decision, the state of the video game may be transitioned from one state to the next based on the move or decision. For example, state A may be the initial state of a video game. At state A 310, when a game agent chooses the decision AB, the state of the video game is transitioned from the state A 310 to the state B 320. However, if the game agent chooses the decision AC, then the state of the video game is transitioned to the state C 330 (rather than state B 320).

At state B 320, the game agent can choose between decision BD and decision BA. If the game agent chooses the decision BD, the state of the game is transitioned to state D 340. If the game agent chooses decision BA, the state of the game is transitioned back to state A 310.

At state C 330, the game agent has three available options: decision CB, decision CD, and decision CA. The decision CB will cause the video game to transition back to state B 320; the decision CD will cause the video game to transition to state D 340; and the decision CA will cause the video game to transition to state A 310.

At state D 340, the game agent does not have a choice. Decision DA is the only available option. The decision DA causes the state to transition from the state D 340 to the state A 310.

Different types of game agents may make different decisions at each state. For example, a random agent may be configured to make a random move or decision at a given state. For example, at state C 330, the random agent may randomly pick among decisions CA, CD, and CB. In some embodiments, each decision may be associated with a weighted value that determines the probability that the agent will select a specific action. For example, the random agent may have 50% probability of picking decision CB, 30% probability of picking decision CD, and 20% probability of picking decision CA.

A static agent can make a move or decision based on a predefined path. For example, at state C 330, the static agent may always pick decision CA at state A 310 and the static agent always picks decision AB. As another example, the static agent may always pick the move that gives the maximum return at the current state, regardless of whether the long term return is maximized.

A learning agent may not have a deterministic set of rules that govern the agent at every operating state. Rather, the learning agent can adapt its strategies based on the current state of the video game as well as based on the information obtained in the previous states or attempts. For example, at state C 330, the learning agent may initially choose decision CD. However, by choosing decision CD, the learning agent may realize that the only option it has at state D 340 is the decision DA which may not be desirable. As a result, at the next try, the learning agent may choose decision CB instead.

In some embodiments, a game agent may be a mixed type. For example, the game agent may be a combination of a random agent and a static agent. As another example, the game agent may be a combination of a learning agent and a random agent. As a result, the game agent may make a random decision based on the previous information.

As described with reference to FIG. 1, the telemetry data acquisition system 134 can acquire the state transition information as well as the result of the agent's action. For example, if a game agent moves from state A 310 to state C 330 and back to state A 310, the telemetry data acquisition may record the total rewards collected from such moves, the sequence of the moves, as well as objects encountered or collected at each state of the sequence, among other data.

IV. Example Methods for Automatically Measuring a Game Difficulty

Figure 4:
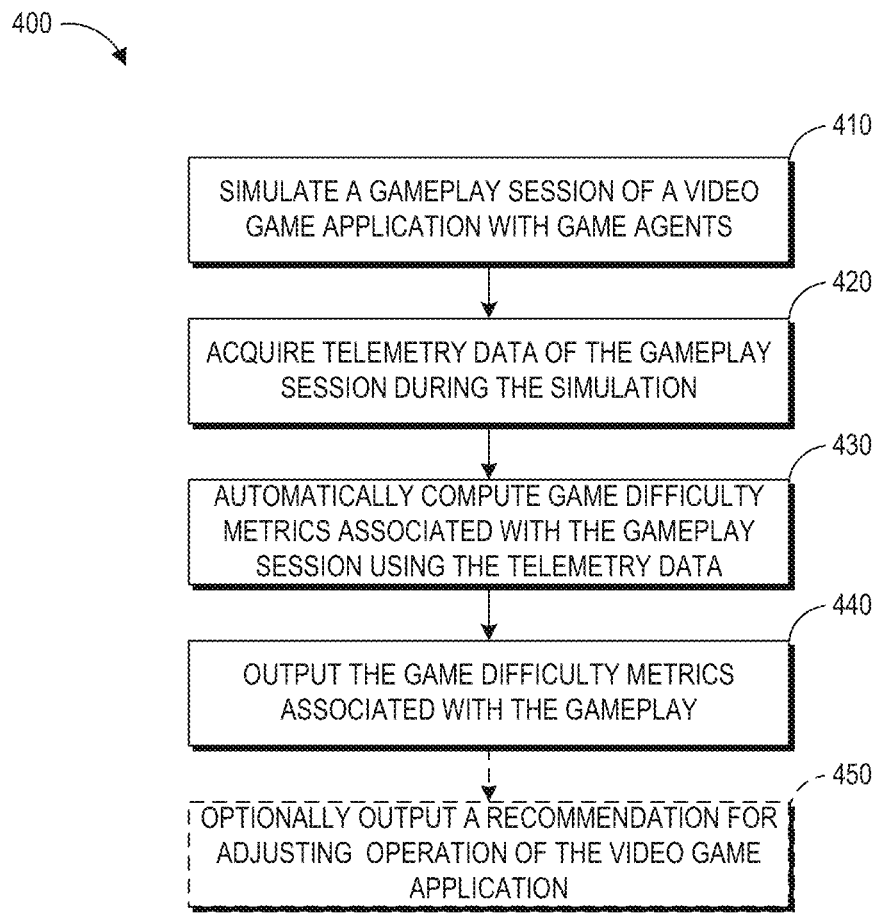
FIG. 4 illustrates an embodiment of a flowchart for automatically measuring a difficulty metrics in a video game.

FIG. 4 illustrates an embodiment of example flowchart for automatically measuring difficulty metrics in a video game. The flowchart 400 in FIG. 4 may be performed by the computing system 102, alone or in combination with the interactive computing system 120 or the game development computing system 150. For example, the computing system 102 may include the game metric analysis system 130, the game agents, and the game application.

At block 410, a computing system can simulate gameplay of a video game application with game agents. The video game application may be the video game application 104 described in the embodiments shown in FIG. 1, and the game agents may be one or more game agent(s) in a game agent system 108 described in the embodiments shown in FIGS. 1 and 2. The game agents may have different types. For example, some game agents (such as random agents or static agents) can perform a randomly chosen action or perform a predefined action. Other game agents (such as learning agents) can dynamically change their behaviors based on the available information of a game state and previously acquired information. The game agents may be divided into different groups based on their types and characteristics. For example, the game agents having the same AI levels may be executed and analyzed together.

At block 420, the computing system can acquire telemetry data of the gameplay while the game agents are playing or after they play the video game application. The telemetry data may include the result of the game agent's action as well as the intermediary data such as game state transition information. The telemetry data may be used by a data analysis system for recreating the game states and analyzing the video game application.

At block 430, the computing system can automatically calculate game difficulty metrics using telemetry data acquired as the game agents are playing the game application. The game difficulty metrics may be associated with measuring the difficulty of a game, a level in the game, or a state in the game. Where multiple groups of game agents are used, the game metrics may be calculated separately for one or more groups. The statistics of the game difficulty metrics may be compared to a variety of threshold conditions for classifying aspects of the video game application into different levels of difficulties (for example, medium, easy, hard, and the like).

At block 440, the computing system can output the game difficulty metrics associated with the gameplay. For example, the computing system can generate a report which can include the game difficulty metrics and their associated statistics. For example, the game difficulty metrics calculated by the computing system may include relative speed of progression among the game agents.

At block 450, the computing system can optionally output a recommendation for adjusting the video game application's operation for example, based on rules applied by a rules engine. For example, if the relative speed of progression indicates that a vast majority of game agents take too long to complete the game, the report generated by the computing system may include a suggestion for reducing the difficulty of certain levels. For example, the report may include suggested changes for one or more seed values associated with certain aspects of the video game. For example, the suggested changes may include increasing or decreasing the seed values of a rare object appearing at a certain location in the game environment. In some embodiment, the computing system may automatically update the video game's operation based on the recommendation. For example, the computing system can adjust the seed value based on the suggestions in the report. In some embodiments, the report may be presented to a game developer via a data visualization system. The game developer can accordingly adjust the game's difficulty based on the report.

V. Example User Interfaces of a Data Visualization System

Figure 5A:
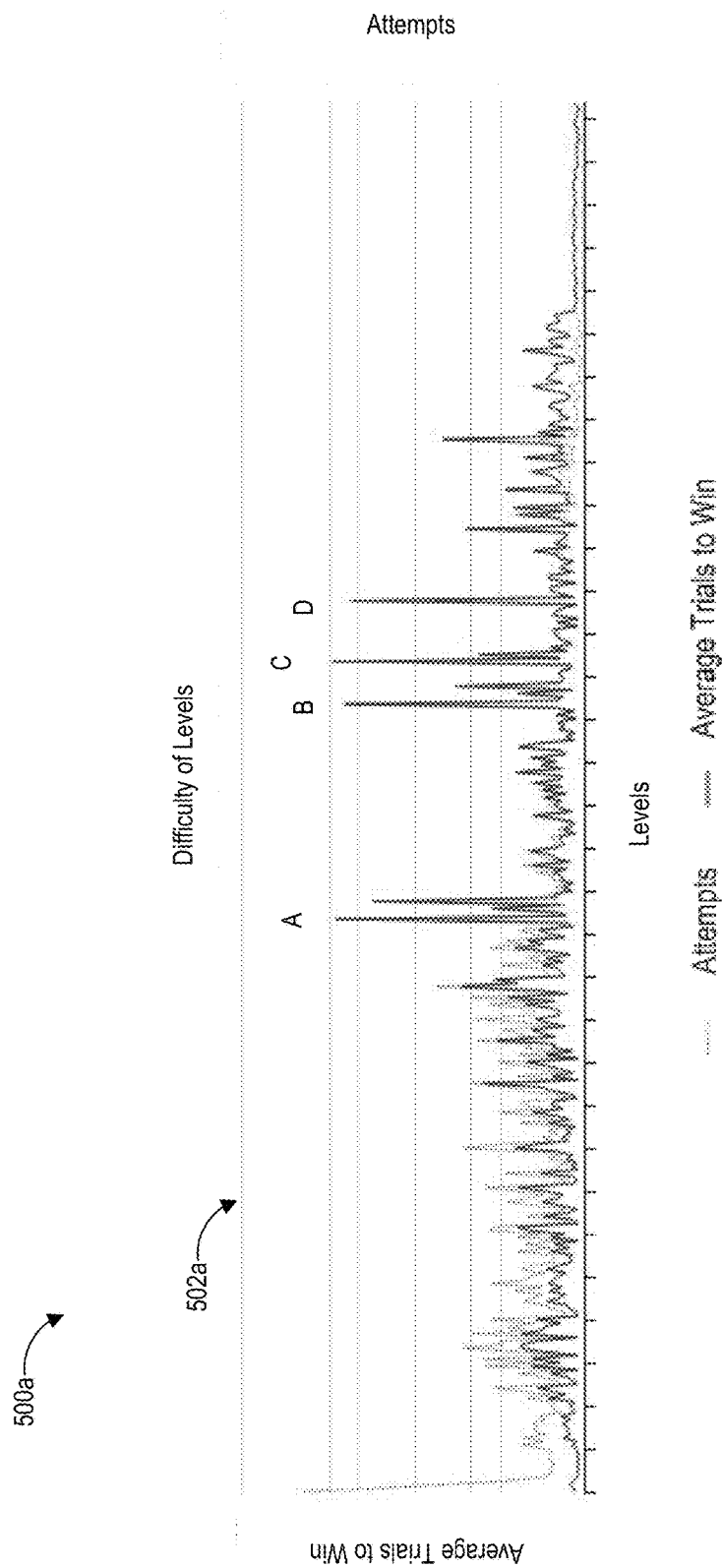
FIGS. 5A and 5B illustrate embodiments of user interfaces for a data visualization system.
Figure 5B:
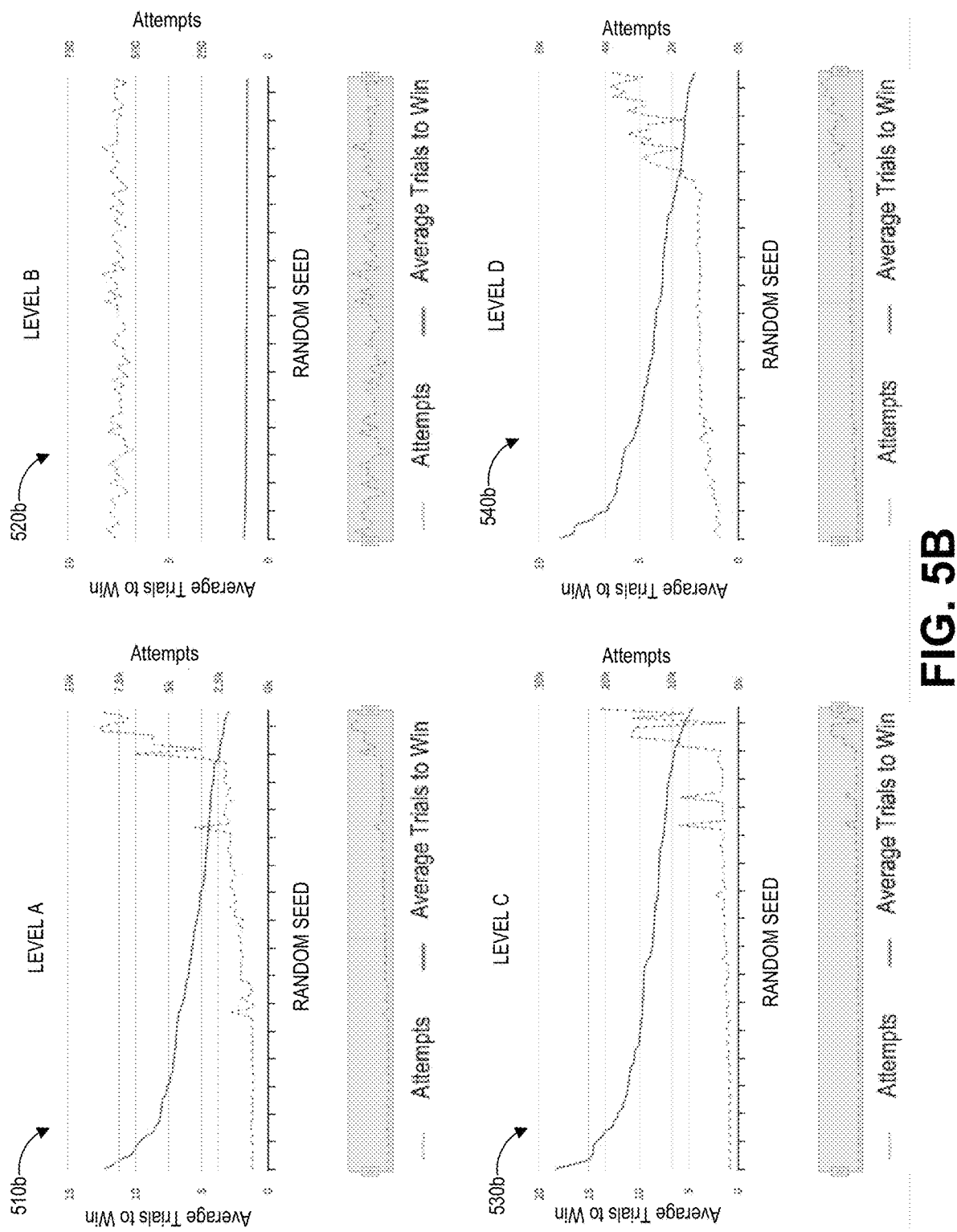

FIGS. 5A and 5B illustrate embodiments of example user interfaces for a data visualization system, such as the data visualization system 132 shown in FIG. 1. The user interfaces may be generated and presented by the game development computing system 150 and/or the game metric analysis system 130 described in FIG. 1.

The user interface 500a in FIG. 5A illustrates embodiments of graphs for the game difficulty metrics of levels in the video game. The video game associated with the FIGS. 5A and 5B may be a turn-based game having multiple levels. The game difficulty metrics may include data and analysis of one or more game metrics and statistics associated with the game metrics. The graph 502a presents the analysis related to two game metrics. One is the average trials to win while another is the total number of attempts by all agents. These two game metrics are plotted against multiple levels in the video game. The graph 502a illustrates several peaks for the average trials to win. For example, the peaks are around the levels A, B, C, and D. Because these levels take a significant amount of trials to pass, there may be a significant decrease in the number of game agents remaining after the level D.

The data associated with the graph 502a may be acquired using learning agents. Accordingly, although there is a significant drop in the total number of attempts in the very beginning, some learning agents may be able to learn from the mistakes in the early game and apply the learning into the later levels. As a result, the amount of fluctuations for the total number of attempts between level A and level D may not be very significant.

FIG. 5B illustrates embodiments of example graphs 510b, 520b, 530b, and 540b where each graph presents a detailed analysis of game metrics of a level in the video game. For example, the graph 510b represents the difficulty of level A; the graph 520b represents the difficulty of level B; the graph 530b represents the difficulty of level C; and the graph 540b represents the difficulty of level D. Similar to FIG. 5A, these example graphs also measure two game metrics: the average trials to win and the total number of attempts by all agents. These two game metrics are measured against the random seeds in each level. Each seed is represented by the seed identifiers in these graphs. The random seed shown in FIG. 5B can determine the initial condition of each board which in turn impact the difficulty. These seeds can be changed to alter the difficulty of a level.

For example, in level A, the curve representing the total number of attempts is relative flat but gradually increases towards the right side. However, the curve for average trials to win shows an inverse relationship as compared to the total number of attempts. This may show that the seeds on the right side of the curve may be encountered more frequently than the seeds on the left side of the curve. In addition, the seeds on the right side may be easier to pass than the seeds on the left side of the curve. The graph 540b also shows similar relationship between the average trial to win and the total number of attempts. However, the scale of the total number of attempts in graph 540b may be smaller than that in graph 510b. This may suggest that level B is relatively easier than the level A.

As another example, the graph 520b, suggests that level B is an easy level which the designers will take into account for rearranging the levels and adjusting the player journey.

As yet another example, level C may be the most difficult level in levels A-D. As shown in the graph 530b, the average number of trials to win is highest. However, the seeds on the right end may be relatively easier comparing to other seeds in the same level. For example, there are relatively fewer attempts at these two seeds and the average number of trials to win is relatively small compared to other seeds in the same level.

Figure 6:
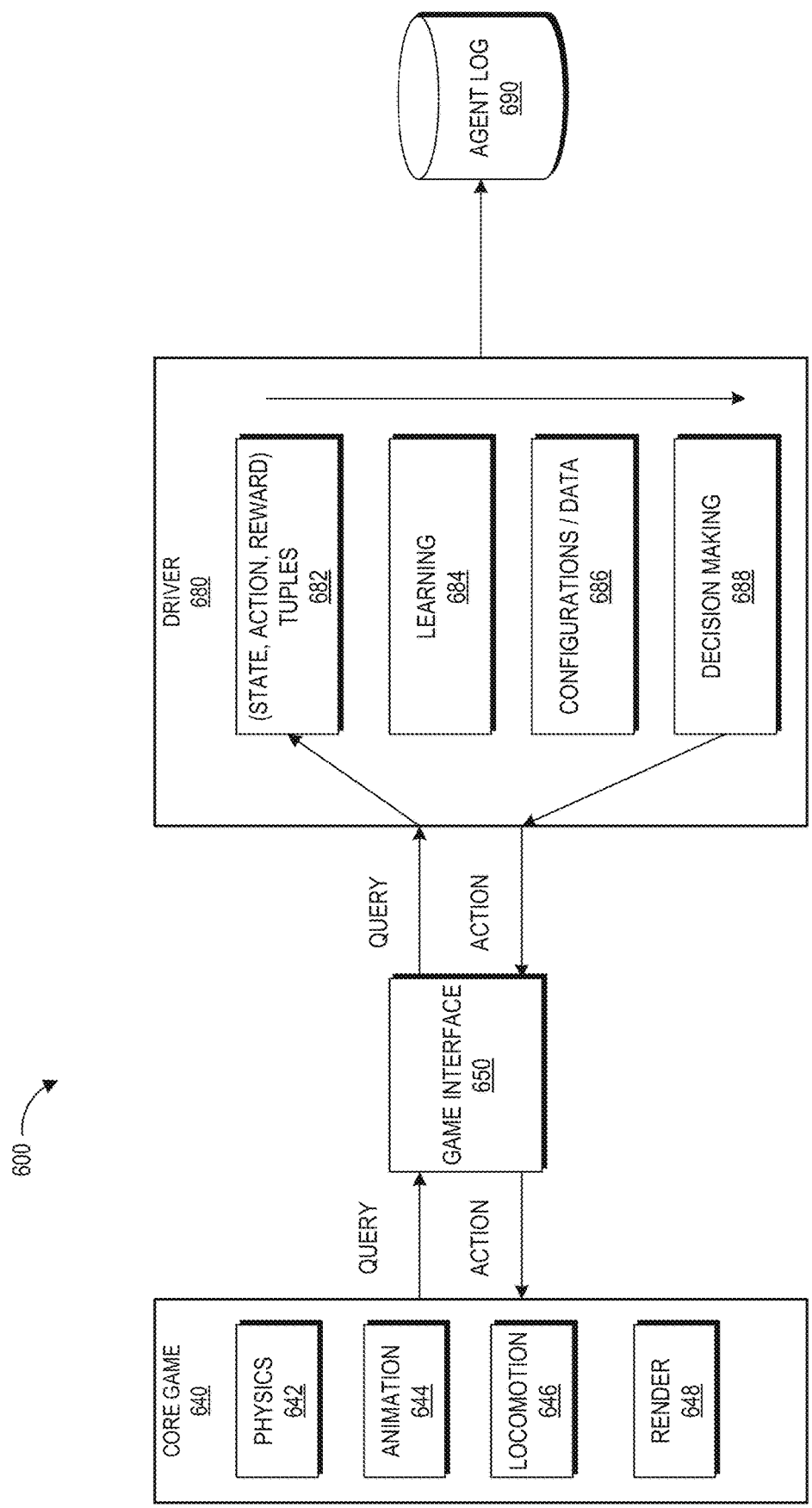
FIG. 6 illustrates an embodiment of a computing environment for interfacing a game agent system with a video game application.

VI. Examples of Interacting with a Video Game Application Using a Game Agent System FIG. 6 illustrates an embodiment of a computing environment for interfacing a game agent system with a video game application. The example computing environment 600 includes a core game 640, a game interface 650, a driver 680, and an agent log 690. The core game 640 and the game interface 650 may be part of the video game application 104. For example, core game 640 may include logics that control the video game application's 104 operation. The game interface 650 may be an API which the driver 680 may use to interface with the core game 640. The driver 680 may be part of the game agent system 108. For example, the driver 680 may include logics for controlling a game agent's operation. The agent log 690 may record the operations of the game agent during a game play. For example, the agent log 690 may include telemetry data acquired while the game agent is executing. In some embodiments, the agent log 690 may be part of the data store 126 (or the data store 124).

In this example, the core game 640 includes a physics module 642, an animation module 644, a locomotion module 646, and a render module 646. In other examples, more or fewer modules may be included in the core game 640. The physics module 642 may be configured to simulate the movements of game objects over time (such as for example, simulating a free fall motion), detect when objects collide with one another, and determine appropriate response in the event of a collision. The animation module 644 is used to provide animation of an in-game character. For example, the animation module 644 can include instructions to move the arms and legs of a game avatar in a way similar to a human's natural walking behavior. The locomotion module 646 may be used to simulate a player's climbing, jumping, or other types of motions. The render module 648 may be configured to render graphics such as visual effects, movements, and so on, of a video game application.

The driver 680 can include tuples module 682. The tuples module can determine (or access) state information of a given state such as for example, new states available, valid actions at the given state, as well as rewards available. The driver 680 a learning module 684 (such as when the game agent is a learning agent). The learning module 684 can adapt the game agent's movements at a given state based on information acquired in the previous states or in the prior gameplay sessions. The configurations/data module 686 can include agent's characteristics, such as for example, the agent's persona, and/or data used by the learning agent to adapt. The decision making module 688 can be configured to calculate an agent's move associated with a state. The decision making module 688 may calculate the agent's move based on information in other modules such as for example, the tuples module 682, the learning module 684, and the configuration/data module 686.

In the example computing environment 600, the video game application can include a query system for looking up the state information (including the current state, all valid actions at the current state, and new state). For example, the core game 640 can communicate a query of state information via the game interface 650 to the driver 680. The tuples module 682 of the driver 680 can parse the query information and identify information associated with the current state (such as, for example, the new states available, valid actions at the current state, and the rewards associated with the actions). The information associated with the current state may be used by the learning module 684 to adapt the probability of the game agent picking an action. The game agent can further determine whether to pick an action based on the configurations of the game agent. Using the information associated with the current statement, information learned (using the learning module 684), and the configurations of the game agent, the decision making module 688 can select an action of the game agent for the current state. This action may be communicated back to the core game 640 via the game interface 650.

The agent log 690 can record the game agent's decision making process. for example, it can record the calculations performed and data generated by the tuples module 682, the learning module 684, the configurations/data module 686, and the decision making module 688. Advantageously, in some embodiments, by recording the game agent's decision making process, the game metric analysis system 130 can compute game difficulty metrics more accurately than the using data acquired by the game players during the beta phrase of the video game because the decision making process of the game players may not be recorded by the computing system 102.

Figure 7:
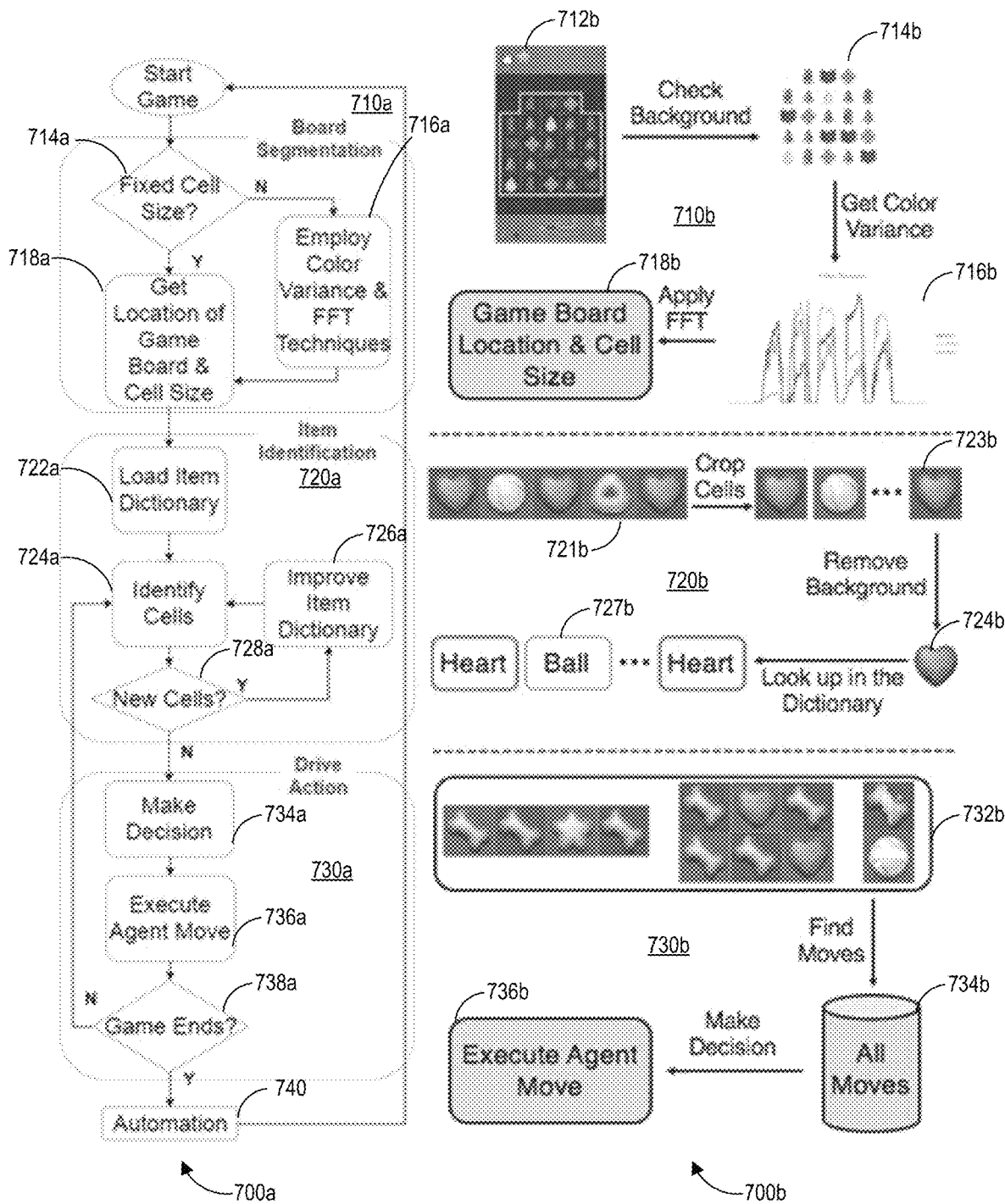
FIG. 7 illustrates an embodiment of a process for interacting with a video game application using a game agent system.

FIG. 7 illustrates an embodiment of a process for interacting with a video game application using a game agent system. The video game illustrated in FIG. 7 may be a turn-based game such as a match-3 game. The process 700a illustrates an example process for a game agent when simulating the game play. The process 700a includes subprocesses 710a, 720a, and 730a. The process 700b shows screens of the gameplay while the game agent is performing the process 700a. The process 700b includes subprocesses 710b, 720b, and 730b. The examples in FIG. 7 may be illustrated by the computing system 102 or one or more of its components such as for example the game agent system 108, video game application 104, and so on.

Subprocess 710a and its corresponding subprocess 710b illustrate an example process for board segmentation where the game agent may analyze the location of the board and color variations associated with the board. The subprocess 720a and its corresponding subprocess 720b illustrates an example process for item identification, where the game agent can identify specific items on the board. The subprocess 730a and its corresponding subprocess 730b illustrates a drive action where the game agent can make a decision and execute a move in accordance with the decision.

At block 714a of the subprocess 710a, a game agent can determine whether a board has fixed cell size. If the cell size is fixed, the subprocess 710a proceeds to block 718a. If the cell size is not fixed, the game agent can analyze the layout of the game play screen by employing color variance and Fast Fourier Transform (FFT) techniques at block 716a. At block 718a, the game agent can get the location of the game board (for example, as shown on the screen) and the cell size.

The screen 712b in the subprocess 710b illustrates a gameplay screen. The subprocess 710b can check the background of the gameplay screen and removing the background (as shown in the screen 714b. The subprocess 710b can get color variance based on the screen 714b. The color variance may be used to generate a color plot as shown in the screen 716b. The color plot 716b may include the amount of red/blue/green colors at a given location of the screen. The color variance may be used together with the FFT to determine the game board location and cell size at block 718b.

In the subprocess 720a, the game agent can load an item dictionary at block 722a. The item dictionary can include a collection of all items on the board. The item may be associated with its identifying information such as the name of the item, the color of the item, and optionally the rewards associated with the item. At block 724a, the game agent can identify the cells, for example, based on the item dictionary. At block 728a, the game agent can determine whether there is still a new cell that has not been added to the item dictionary. If a new cell is present, at block 726b, the game agent can improve the item dictionary for example by adding the new cell into the item dictionary and proceed to block 724a. If the new cell is not present, the game agent proceeds to the block 734a. The game agent can keep performing blocks 724a, 726a, and 728a, until all items have been identified on the board.

The screen 721b of the subprocess 720b shows a portion of the video gameplay screen. In the screen 721b, 5 cells are shown. The cells on the screen 721b can be cropped as shown in the screen 723b where each of the 5 cells is separated from the other cells. The game agent can remove the background for a cell to identify the item in the cell. For example. as shown in screen 724b, a heart item is identified. The game agent can look up the identified item (e.g. the heart) in the item dictionary. The game agent can also add the identified item to the item dictionary if the identified item is not in the item dictionary. As shown in the screen 724b, the items of the screen 721b may be identified as pink heart, green ball, pink heart, orange triangle, and pink heart.

In the subprocess 730a, the game agent can make a decision at block 734. The decision may be based on the game agent's characteristics as well as items present on the board. At block 736a, the game agent's move may be executed. For example, the game agent may communicate the decision to the video game application so that the video game application can play the game agent's move. At block 738a, the game agent can determine whether the game has ended. If the game has not ended, the process 700a proceeds to block 724a where the game agent can perform the item identification subprocess 720a based on the new state caused by the agent's move at block 736a. If the game has ended, at block 740, process 700a may proceed to the block 740 which may cause the gameplay to be restarted.

In the subprocess 730b, the screen 732b show the current state of the board. The game agent can find the available moves in the current state. For example, as shown in block 734b, the game agent may communicate with a data store which includes all valid moves for a given state. The game agent can make a decision based on the information associated with the current state of the board. At block 736b the game agent's move is executed causing the video game application to be transitioned to a new state.

VII. Overview of Computing Device

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively or additionally, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a video game is being played.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online, application of fraud detection, and/or generation of a fraud detection model.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a video game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
a non-transitory computer-readable storage medium having computer-readable instructions stored therein; and
one or more processors configured to execute the computer-readable instructions to perform steps comprising:
simulating gameplay sessions of a first gameplay level of a game application using a plurality of game agents, wherein the first gameplay level is generated based at least in part on a selection of a game seed of a first plurality of game seeds associated with the first gameplay level;
recording telemetry data associated with the plurality of game agents while the plurality of game agents is executing the first gameplay level within the game application;
calculating at least one game difficulty metric associated with individual game seeds of the first plurality of game seeds based at least in part on the telemetry data recorded during the gameplay sessions;
generating a result based on the at least one game difficulty metric, wherein the result comprises a game difficulty determination of the first gameplay level, wherein the result comprises a game difficulty determination for each game seed in the first plurality of game seeds; and
based at least in part on the result, updating a number of game seeds of the first plurality of game seeds that are available for the first gameplay level of the game application.

2. The system of claim 1, wherein the one or more processors are configured to execute the computer-readable instructions to perform further steps comprising generating a recommendation for updating a game difficulty level of the first gameplay level, wherein the recommendation is generated in response to a determination that the result of the game difficulty determination fails to satisfy a difficulty threshold for the first game level.

3. The system of claim 1, wherein the first gameplay level is one of a plurality of gameplay levels of the game application.

4. The system of claim 1, wherein individual game seeds are pseudo-randomly generated.

5. The system of claim 1, wherein, during runtime of a gameplay session of the game application, each game agent of the plurality of game agents is configured to:
identify a current gameplay state in a virtual game environment of the game application;
identify one or more available actions associated with the current gameplay state;
select an action of the one or more available actions based at least in part on defined operational characteristics of the game agent; and
execute the selected action within the virtual game environment.

6. The system of claim 1, wherein the one or more processors are configured to execute the computer-readable instructions to perform further steps comprising:
generating a report based on the result comprising the game difficulty determination; and
communicating the report to a computer for display through a display device;
wherein the at least one game difficulty metric comprises at least one of: a progression speed, a win ratio, or a total reward collected.

7. The system of claim 1, wherein the result comprises at least game difficulty determinations for each game seed in the first plurality of game seeds.

8. The system of claim 1, wherein the one or more processors are configured to execute the computer-readable instructions to perform further steps comprising modifying at least one seed parameter of individual game seeds to change a difficulty level of the game seed.

9. The system of claim 8, wherein when modifying the at least one seed parameter the one or more processors are further configured to execute the computer-readable instructions that comprise including or removing seed value options from a set of available seed values.

10. The system of claim 1, wherein when updating the number of game seeds the one or more processors are further configured to execute the computer-readable instructions that comprise adding or removing game seeds from the first plurality of game seeds.

11. A computer-implemented method comprising:
    simulating gameplay sessions of a first gameplay level of a game application using a plurality of game agents, wherein the first gameplay level is generated based at least in part on a selection of a game seed of a first plurality of game seeds associated with the first gameplay level;
    recording telemetry data associated with the plurality of game agents while the plurality of game agents is executing the first gameplay level within the game application;
    calculating at least one game difficulty metric associated with individual game seeds of the first plurality of game seeds based at least in part on the telemetry data recorded during the gameplay sessions;
    generating a result based on the at least one game difficulty metric, wherein the result comprises a game difficulty determination of the first gameplay level, wherein the result comprises a game difficulty determination for each game seed in the first plurality of game seeds; and
    based at least in part on the result, updating a number of game seeds of the first plurality of game seeds that are available for the first gameplay level of the game application.

12. The method of claim 11 further comprising generating a recommendation for updating a game difficulty level of the first gameplay level, wherein the recommendation is generated in response to a determination that the result of the game difficulty determination fails to satisfy a difficulty threshold for the first game level.

13. The method of claim 11, wherein, during runtime of a gameplay session of the game application, each game agent of the plurality of game agents performs operations comprising,
    identifying a current gameplay state in a virtual game environment of the game application;
    identifying one or more available actions associated with the current gameplay state;
    selecting an action of the one or more available actions based at least in part on defined operational characteristics of the game agent; and
    executing the selected action within the virtual game environment.

14. The method of claim 11, further comprising:
    generating a report based on the result comprising the game difficulty determination; and
    communicating the report to a computer for display through a display device;
    wherein the at least one game difficulty metric comprises at least one of: a progression speed, a win ratio, or a total reward collected.

15. The method of claim 11 further comprising modifying at least one seed parameter of individual game seeds to change a difficulty level of the game seed.

16. The method of claim 15, wherein modifying the at least one seed parameter includes including or removing seed value options from a set of available seed values.

17. The method of claim 11, wherein updating the number of game seeds comprises adding or removing game seeds from the first plurality of game seeds.

* * * * *